CARD SELECTING DEVICE

Filed Jan. 3, 1949 2 Sheets-Sheet 1

Inventors
Calvin N. Mooers
Charlotte Davis Mooers
by Roberts, Cushman & Grover
Att'ys Inventors
Calvin N. Mooers
Charlotte Davis Mooers
by Roberts, Cushman & Grover
Att'ys Patented Jan. 12, 1954 2,665,694

UNITED STATES PATENT OFFICE 2,665,694

CARD SELECTING DEVICE

Calvin N. Mooers and Charlotte Davis Mooers, Cambridge, Mass., assignors, by mesne assignments, to Calvin N. Mooers, Cambridge, Mass.

Application January 3, 1949, Serial No. 68,964

5 Claims. (Cl. 129—16.1)

A punched card selective system is, as herein understood, an arrangement for finding and having access to items falling within any specified classification of subject matter that is part of a collection of recorded information. To each item of information in that collection, a card is delegated. Upon this card either the information itself or the citation of its source is recorded. Each card is punched in a manner descriptive of the information content associated with it. Then, by processing a set of such cards through a selective machine which is able to sense the punches upon each card and to segregate the cards bearing specified patterns of punches, it is possible to find all cards bearing upon a desired class of subject matter in the collection.

A punched card selective system is useful in proportion to its ability to give access to a great amount of information by means of a large number of cards as well as to its ability to segregate information bearing cards into classes on the basis of a wide variety of selective criteria.

For the first mentioned ability, that of conveniently making use of a large number of cards in the collection, it is necessary that the selecting or sorting device be able to process the cards with rapidity, that the cards be convenient to handle, and that there be a simple and uncomplicated process for placing the cards in the selector mechanism and for returning them to the storage file.

For the other ability, that of allowing segregation on a wide variety of selective criteria, an adequate method for describing the information content of the card within the bounds imposed by the limited number of allowable punches on the card is a requisite. Hitherto, no fully satisfactory method for formulating this description in terms of punches, otherwise known as coding of the card, was known. Adequate characterization of the information material apparently required a greater degree of descriptive ability and freedom than the available coding systems provided. This unfortunate situation has actually blocked the use of punched cards in a large number of applications, of which the indexing of scientific and technical material is an important example. This situation is remedied by the system described and claimed in copending application Serial Number 774,620 of September 17, 1947, which includes a new method of coding information, applicable to punched cards, which offers a very wide variety of selective criteria, and which surmounts most of the disadvantages of previous methods of coding. With this new solution to the coding problem, the burden of success of a punched card selective system now lies upon the physical means of applying the system to given practical situations: the cards, the selector apparatus, and various appurtenances. With these and their correlation to a complete system the present invention is concerned.

Our present invention is particularly concerned with those embodiments of our above mentioned general system which rely on sorting marked cards of the type that bear descriptive punches in the form of notches in an edge of the card. Selective sorting of notched edge cards is not broadly new, and numerous devices for that purpose have been developed. Most of these devices are quite complicated, and employ such components as elaborate keyboard mechanisms, cards of special shape or construction, cards with metal inserts, and the like. In general, the prior selector devices are so conceived and constructed that they are unable to process and sort a volume going into thousands of cards rapidly and efficiently. Until now, this inadequacy has not been a significant liability. With the inadequacies of the coding systems hitherto available, there has often been no point to the accumulation of very large collections of punched cards. Such collections, covering a wide range of information material, were impractical, simply because the cards could not be adequately coded for selection.

Now, with the existence of an adequate coding system, such as that described in the above mentioned copending application, it has become feasible and desirable to set up collections of large numbers of punched cards, since a large variety of intelligence can be adequately described on the cards by the new coding system. The collection of cards will grow with use. A means of rapid and convenient sorting of thousands of cards becomes essential. For a system that is to be used over a long period of years, a simple, foolproof selecting mechanism is desirable. The cards should be inexpensive to procure, and simple to write upon and otherwise to prepare.

Our invention is concerned with attaining these ends, and accordingly one of its primary objects is to provide a system and specific means for the rapid and efficient preparation, handling, and selective sorting of notched-edge type punched cards, by which collections of thousands of cards can be handled efficiently and at a high speed.

It is another object of this invention to provide a card handling tool for the convenient, rapid, and safe transporting of cards from the file to the rapid card sorting device and back again to the file, in addition to its primary use as a cooperating element of the rapid card sorting device.

In one of its principal aspects our invention is concerned with the handling of intelligence carried on record cards in a system which comprises a card selecting device having card positioning means such as bars arranged in a pattern within a coordinate scheme defining the placement of the positioning means for spatial discrimination between two groups of cards in accordance with the selecting pattern, and comprises further a compendium of intelligence descriptive terms and coding patterns correlated with fiducial marks to respective terms, this compendium having the purpose of marking the third essential element of my system namely a stack of cards, individual cards being marked with edge notches in a pattern within a notch placement coordinate scheme, the coding patterns and the fiducial marks of the compendium registering with the notch placement coordinate scheme of the cards and with the coordinate scheme for defining the placement of the positioning means such as bars, of the selecting device.

In another aspect, the invention deals with a device for selecting cards of the type having a pattern of coded notches placed in an edge thereof which device comprises a receptacle for these cards, selector means such as bars, guide means for example perforations of the receptacle, for positioning effective portions of the selector bars within the receptacle according to a placement defining scheme in a selective pattern, the selector bars being placed in the receptacles in such a manner that they will support the cards resting thereon by gravity with their notched edges, and which bars match the notches to accept the cards whose notches include the pattern of the bars, the selector being further combined if desired in accordance with an additional feature of the invention, with a tool for engaging the cards the notches of which are rejected by the pattern of the bars.

In a further aspect of our invention, a selector may be used which includes a receptacle, an arrangement for vibrating the receptacle, and a series of guides for positioning the selector means such as bars within the receptacle according to a placement defining pattern.

These and other objects, aspects and characteristic features of our invention will appear from the following description of several practical embodiments which refers to drawings wherein Fig. 1 is a view of a card notched in accordance with our invention;

Figure 1:
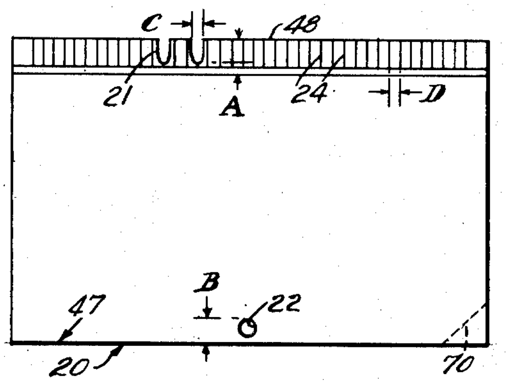
Figure 3:
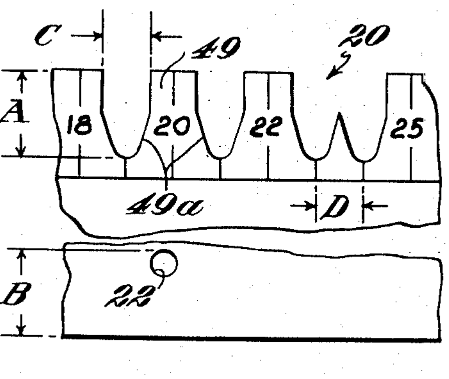
Fig. 3 is an enlarged fragmentary view of a notched card according to Fig. 1, indicating the spatial arrangement and dimensional relation of notches and locking hole.

In Fig. 1, numeral 20 designates one form of notched edge type card employed in the present invention. By card is here meant any sheet material, whether cardboard, metal or plastic, and moreover any composite structure having the physical dimensions of a card and capable of being used as a card according to the invention. One edge 48 of the card 20 is reserved for the pattern of descriptive punches or notches 21. Near the opposite edge 47 of the card is a locking hole 22, which is preferably centered upon the card. In order that the cards cannot inadvertently be faced in the wrong direction while in a pack, a common corner of all the cards is cut with a bevel 70. For convenience in placing the descriptive notches 21 in the card, a numbered scale 24 is accurately printed upon the face of the card. For optimum certainty of operation of the selector mechanism, the depth A of the notches 21 cut in the edge of the card should be equal to the distance B from the inner edge of the locking hole 22 to the bottom edge of the card 47, as indicated in Figs. 1 and 3.

The notches can be placed in the edge of the card with a hand punch. The width C of a notch 21 should be slightly greater than the center line spacing D between two adjacent notches to insure that adjacent notches have no spike of card stock between them. In order that the projection 49 of the card stock between two next-to-adjacent notches be as strong as possible, the shape of the notch may be taken so as to leave a shoulder at the base of the projection, as indicated at 49*a* of Fig. 3.

Figure 2:
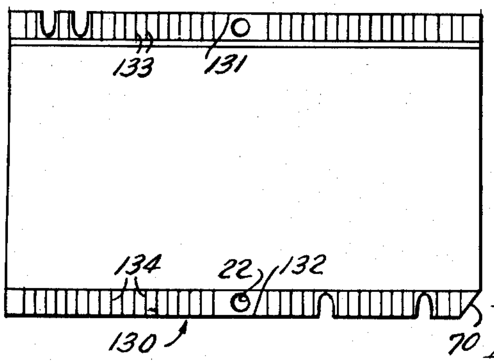
Fig. 2 is a similar view of a card having two instead of one notch bearing edges.

As shown in Fig. 2, two edges of a card can be provided with a notch pattern; this embodiment will be described in detail below.

Figure 4:
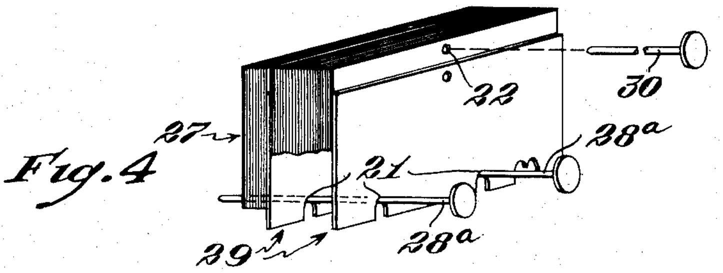
Fig. 4 is an isometric view of a stack of cards, illustrating the technique of selecting and separating cards in accordance with our invention.

The general manner of selection according to the invention, of a desired card from an unordered pack of cards is illustrated in Fig. 4. The pack of cards 27 is supported upon and mutually positioned with respect to the sorting bars 28*a*, the notched edges of the cards bearing upon the sorting bars. The manner of so mutually positioning the cards and the sorting bars is described in detail below with reference to several embodiments of selectors. Those cards 29 are selected which bear a notch 21 in the position of each and every sorting bar 28*a* irrespective of what other notches they may bear in addition. The selected cards 29, being unsupported in the pack by the sorting bars 28*a*, drop under the force of gravity, if desired, aided by agitation, to a position below the rest of the cards in the pack 27, and they drop to a distance equal to the depth of the notches 21. The rejected cards do not so drop, as each is supported at its edge by at least one of the sorting bars 28*a*. When the cards are in this partially separated condition the pack may be lifted and the offset cards 29 separated out by hand, in which case the locking hole 22 and cooperating tool 30 may be omitted. Otherwise the locking pin 30 or card handling tool may be inserted through the channel formed by holes 22 of the rejected cards of the pack. With the locking pin 30 inserted, there is established a positive segregation of the rejected cards 27 from the selected cards 29.

To complete the separation of the selected cards, two techniques have been found to be particularly suitable for respective purposes. For a rapid sorting device, a pin corresponding to 30 is lifted, carrying the rejected cards away, and dropping from the pack the selected cards.

A rapid sorting device and its mode of use is shown in Figs. 5 to 8. An open-topped box 32 is mounted resiliently upon a base 31 by means of the elastic supports 33. Means for rapidly vibrating the box in the vertical direction with small amplitude are provided. We have found that a small electric motor 35 driving an eccentric weight 36, the frame of the motor being fastened to the bottom 37 of the box 32, is an arrangement well suited for the purpose. Other means such as a D. C. operated buzzer, an A. C. operated electromagnet shaking a heavy armature or a spring vibrator system may be employed, but these have the disadvantage of producing an undesirable amount of noise. In order to isolate the vibration so generated from the base, and thus the table or other working surface, the natural frequency of the box 32, when loaded with cards or when empty, upon the elastic supports 33, should be very much lower than the frequency of the vibrating means. This is obtained by making the elastic supports quite soft or resilient.

Figures 5, 6, 7, 8:
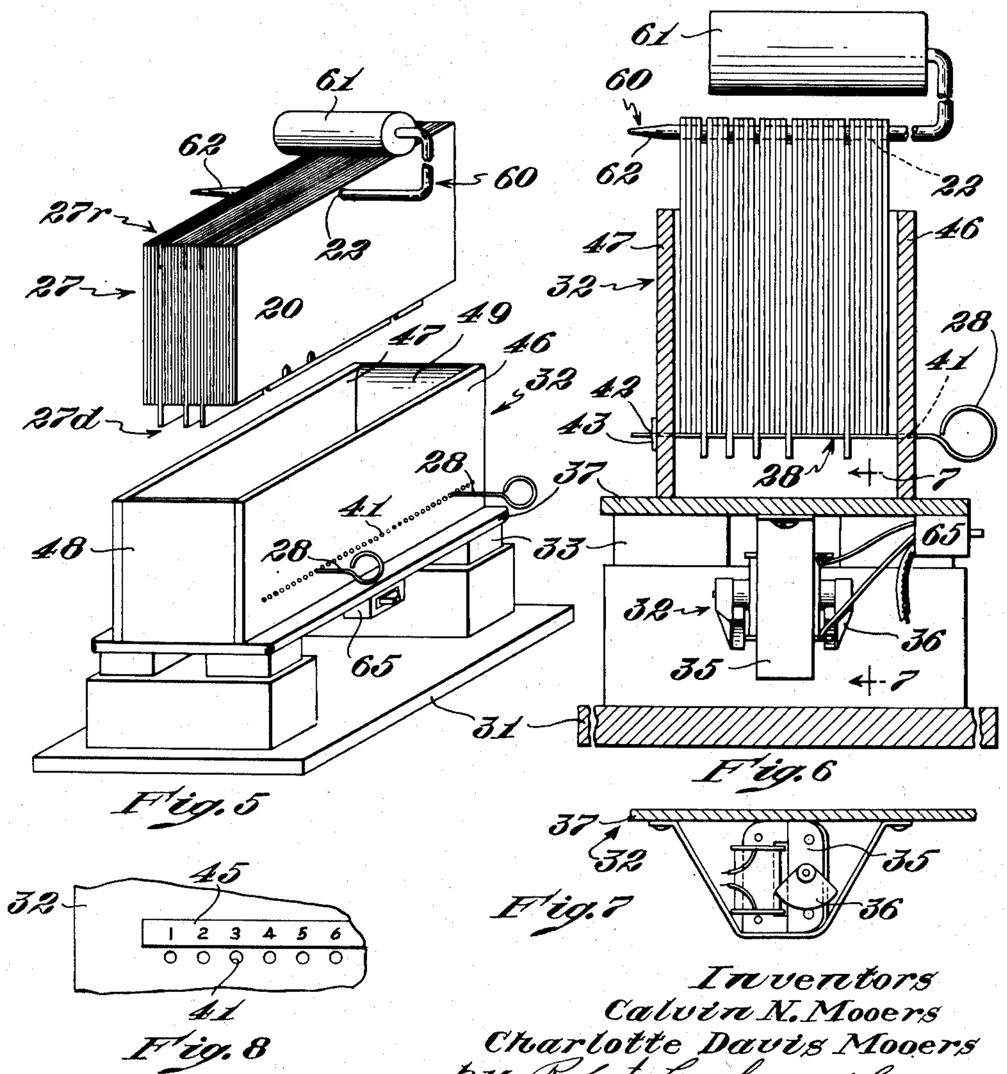
Fig. 5 is an isometric view of a rapid selector in accordance with our invention, showing a stack of cards lifted from the selector by means of a separating tool.
Fig. 6 is a transverse section through the selector according to Fig. 5.
Fig. 7 is a section on line 7—7 of Fig. 6.
Fig. 8 is a fragmentary elevation of the front panel of the selector box shown in Fig. 5.

We have found by experimenting with one typical and especially useful embodiment of the rapid sorting device according to Fig. 6, namely one for use with 5 by 8 inch index cards, that a motor vibrator frequency of about 3,000 R. P. M., a vibrating displacement in the vertical direction of the driven box of about $\frac{1}{32}$ inch, and a natural frequency of the box upon its mounts of less than ten cycles per second gives excellent results.

To aid the cards to spread apart while in the rapid sorting device and not to jam together, we found it to be advantageous to place the axis of the vibrator motor perpendicular to the plane of the cards, thus causing the horizontal component of vibration produced by the eccentric weight to occur in the transverse direction of the box, or endwise with respect to the cards. Such endwise vibration of the cards causes the cards to tend to separate one from another, which in turn makes it easier for the selected cards to drop from between their neighbors. In this manner both the vertical and horizontal components of vibration of the rotating eccentric weight are usefully employed.

The selector bars 28 are affixed and positioned in the box 32 in the following simple yet effective manner. A row of holes 41, 42 in the front and rear panels respectively of the box receive and hold the selector bars, and position the bars laterally so that they will properly engage the notches on the cards when the latter are inserted into the vibrated box of the sorting device. To insure that the selector bars will remain in position in spite of the vibration, a section of rubber-like or plastic material 43 may be fastened on the back side of the rear panel in such a fashion that when the sorting bars 28 are completely inserted through the holes 41, 42 of the box, they pass through and are held by the rubber-like material 43. While other manners of bringing the sorting bars into position in the box may be used, the one set forth here has the advantage of simplicity, sturdiness, and lack of noise under the impulse of the vibrator and the impact of cards. A numbered or lettered scale 45, illustrated in Fig. 8, with its characters opposite the row of holes 41, identifies the various selector bar positions in the box 32. The scale 45 marking the positions of the selector bars in the box corresponds with and registers with the scale 24 on the cards 20 which mark the allowed positions for the placement of notches, as described above with reference to Figs. 1 and 3. The row of holes 41 with their placement in the box 32 makes a selector bar placement defining coordinate scheme, which scheme is in register with the notch placement defining coordinate scheme of a card, being the scale 24 on the card 20.

The dimensions of the box 32 have an important bearing upon the correct operation and upon the efficient use of the rapid sorting device. The inside distance between the front and back panels 46, 47 respectively of the box should be about one-half inch greater than the thickness of a pack of cards that may be comfortably grasped in one hand. In actual measure, a front-to-back distance of about 3½ inches has been found convenient for 5 by 8 inch cards. A box deeper than this, such as would hold two handfuls of cards, is actually undesirable, since sorting with the recommended device occurs quite as rapidly as one handful of cards can be inserted and removed. By far the greater part of the sorting time is devoted to handling the cards, and not in waiting for the sorter to operate. Thus there is little efficiency to be gained by sorting two inconvenient handfuls of cards at one time instead of the one handful that we recommend. The end panels 48, 49 respectively of the box should be spaced only slightly more than the width of the cards, and they must have sufficient vertical extent to prevent a card supported on a sorting bar only at one end of the box from rotating and assuming a skew position and dropping from the pack of rejected cards. To give this vertical extent to the end panels, and yet to allow easy handling of the cards, it may be necessary for some sizes of cards to cut a section (not shown) from the top middle of the front and back panels of the box in order to allow the cards to be grasped by hand or to be engaged through hole 22 by the pin of the separator tool 60 now to be described.

The card handling tool 60 is the version of the separator pin 30 which is preferred for use with the rapid sorting device. It consists of a handle 61 affixed above a separator pin 62. The card handling tool 60 is an essential cooperating part of the rapid sorting device when high speed card handling is desired. The tool 60 is used as an aid to transporting a pack of cards to the sorting device, to impale the rejected cards 27*r*, positively to separate them from the desired cards 27*d*, and finally as an aid to transporting the pack of rejected cards back to storage. To transport a pack of cards, the pin 62 of the separator tool is inserted in the channel of holes 22 of a pack of cards, thus locking the cards in a pack. With one hand holding the handle of the tool, and the other grasping the pack of cards, there is little likelihood of spilling a pack of cards.

To perform a selection of cards with the rapid sorting device, a set of selector bars 28 is inserted in holes 41, 42 of the sorter box in such a pattern of bars as to define the set of cards to be selected. The vibrator device 35—36 is set into action by operating switch 65. The cards are stored notched-edge down in file drawers. A handful of cards of the file is then impaled through holes 22 with the tool 60. The handful of cards is lifted and carried with the aid of the tool to the sorter device, where they are inserted notched-edge down into the top of the sorter device. The tool is momentarily withdrawn to allow the selected cards to drop over the selecting bars, and then the tool is reinserted, and this time only the rejected cards 27*r* are engaged by the tool. The tool is lifted, the desired and selected cards 27*d* drop from the pack, and the rejected cards 27r are carried on the tool back to the file. In using the tool, one hand of the operator is placed on the handle of the tool, and the other is used to grasp the top corner of the pack of cards to steady the collection.

Figure 9:
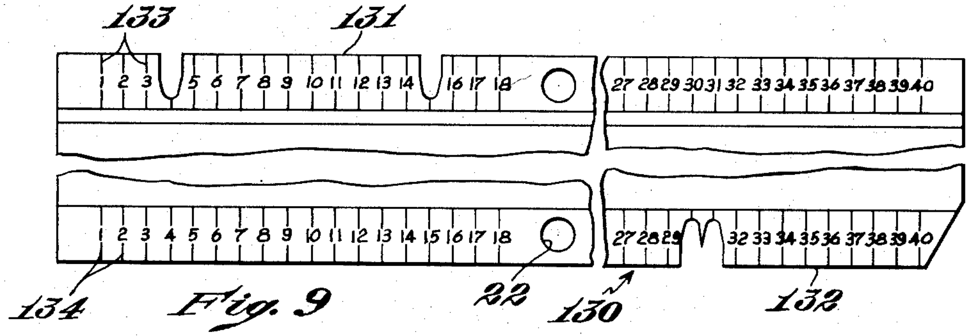
Fig. 9 is a fragmentary view of a notched card according to Fig. 2, indicating the scale and two separating holes.

In some instances, the simple card 120 of Fig. 1 does not have sufficient capacity to bear all notched-in coded information that may be needed upon the single coding edge 24. In such cases a card 130 (Figs. 2 and 9) having two edges 131, 132 with associated notch-placement scales 133, 134 can be used in either the rapid card sorting means or in the adjunct sorting means. In this instance the sorting technique consists in first performing a selection on one edge of the pack according to a defining pattern for selection for that edge, and then the completion of the selection according to the defining pattern for selection for the other edge upon the cards that are separated and selected in the first stage. The cut-off or beveled corner 70 aids in keeping the cards of the pack facing in the right direction in the pack and right edge up.

It should be understood that the present disclosure is for the purpose of illustration only and that this invention includes all modifications and equivalents which fall within the scope of the appended claims.

We claim:

1. A card selecting device comprising a card receptacle having an open top, a row of holes in one of its side walls, reference characters associated with each of said holes and a second row of holes in an opposite wall with each hole of one wall corresponding to a hole of the opposite wall; a plurality of selector bars at least one of which is inserted in a pair of opposite holes; means for affixing bar to receptacle when inserted; a base; a resilient support giving said receptacle when loaded with cards as well as when unloaded a frequency of resonance in the vertical direction of less than ten cycles per second; a motor affixed to the bottom of said receptacle having its axis of rotation parallel to said inserted bar; and an eccentric mass driven by the motor to rotate around said axis at approximately 3,000 R. P. M. and selected to furnish a vertical vibration amplitude of the loaded receptacle of approximately $\frac{1}{32}$ inch.

2. A card selecting device comprising a card receptacle having an open top, a row of holes in one of its side walls, reference characters associated with each of said holes and a second row of holes in an opposite wall with each hole of one wall corresponding to a hole of the opposite wall; a plurality of selector bars at least one of which is inserted in a pair of opposite holes; means for affixing bar to receptacle when inserted; a base; a resilient support giving said receptacle when loaded with cards as well as when unloaded a frequency of resonance in the vertical direction of less than ten cycles per second; a motor affixed to the bottom of said receptacle having its axis of rotation parallel to said inserted bar; an eccentric mass driven by the motor to rotate around said axis at approximately 3,000 R. P. M. and selected to furnish a vertical vibration having an amplitude of the loaded receptacle of approximately $\frac{1}{32}$ inch, said vibration tending to discriminate to groups of notched cards as defined by said bars; and a tool having card engaging means for selectively separating said groups by engaging one of the groups.

3. A notched card sorting device comprising a receptacle, a base for said receptacle, a resilient support between said receptacle and said base, a selector bar within said receptacle, means for positioning said bar relatively to said receptacle, a rotatable shaft bearing an eccentric weight, said shaft being mounted on said receptacle parallel to said bar, and driving means for rotating said shaft.

4. A device for sorting a pack of edge notched cards comprising an open topped receptacle capable of receiving a pack of such cards if placed therein vertically on edge with notches down, a base for said receptacle, a resilient support of said receptacle upon said base, and means for affixing a plurality of adjustable selector bars horizontally in predetermined positions near the bottom of said receptacle to place the axes of such bars perpendicularly to the plane of such cards in said receptacle, a motor affixed to the bottom of said receptacle with its axis of rotation parallel to said axes, and an eccentric mass affixed to the rotating axle of said motor.

5. A notched card sorting device comprising a receptacle, a base, a resilient support of said receptacle upon said base, a selector bar within said receptacle, means for positioning said bar transversely of said receptacle, and vibratory means for imparting to said receptacle a motion in a plane perpendicular to said bar and having components essentially only in the vertical and horizontal directions of said plane.

CALVIN N. MOOERS.
CHARLOTTE DAVIS MOOERS.

UNITED STATES PATENTS

References Cited in the file of this patent

| Number | Name | Date |
|---|---|---|
| 867,618 | Stretch | Oct. 8, 1907 |
| 1,114,518 | Ralph | Oct. 20, 1914 |
| 1,150,793 | Tallmadge | Aug. 17, 1915 |
| 1,235,502 | Robinson | July 31, 1917 |
| 1,340,384 | Downing | May 18, 1920 |
| 1,358,389 | O'Neil | Nov. 9, 1920 |
| 1,404,611 | Hoag | Jan. 24, 1922 |
| 1,727,453 | Tockhorn | Sept. 10, 1929 |
| 1,821,459 | Casey | Sept. 1, 1931 |
| 2,169,050 | Johnston | Aug. 8, 1939 |
| 2,198,127 | Rembold | Apr. 23, 1940 |
| 2,259,463 | Griffin | Oct. 21, 1941 |
| 2,398,777 | Burke | Apr. 23, 1946 |
| 2,417,531 | Welk | Mar. 18, 1947 |
| 2,573,164 | Scheinker | Oct. 30, 1951 |

FOREIGN PATENTS

| Number | Country | Date |
|---|---|---|
| 154,336 | Great Britain | Nov. 27, 1920 |
| 588,888 | France | Feb. 11, 1925 |
| 629,845 | Germany | May 13, 1936 |